US012643505B2

(12) United States Patent (10) Patent No.: US 12,643,505 B2
Wang et al. (45) Date of Patent: Jun. 2, 2026

(54) SENSOR CLEANING APPARATUS FOR A VEHICLE

(71) Applicants: HYUNDAI MOTOR COMPANY, Seoul (KR); KIA CORPORATION, Seoul (KR); DY AUTO Corporation, Asan-si (KR)

(72) Inventors: Sang Heon Wang, Hwaseong-si (KR); Nak Kyoung Kong, Seongnam-si (KR); Dong Eun Cha, Hwaseong-si (KR); Kyung Hwan Kim, Seoul (KR); Jung Kwan Choi, Asan-si (KR)

(73) Assignees: HYUNDAI MOTOR COMPANY, Seoul (KR); KIA CORPORATION, Seoul (KR); DY AUTO Corporation, Asan-si (KR)

( * ) Notice: Subject to any disclaimer, the term of this patent is extended or adjusted under 35 U.S.C. 154(b) by 394 days.

(21) Appl. No.: 18/208,954

(22) Filed: Jun. 13, 2023

(65) Prior Publication Data

US 2024/0149837 A1 May 9, 2024

(30) Foreign Application Priority Data

Nov. 9, 2022 (KR) ......................... 10-2022-0148586

(51) Int. Cl.
| | |
|---|---|
| *B60S 1/56* | (2006.01) |
| *B60S 1/04* | (2006.01) |
| *B60S 1/54* | (2006.01) |
| *G02B 27/00* | (2006.01) |

(52) U.S. Cl.
CPC ............. *B60S 1/566* (2013.01); *B60S 1/0411* (2013.01); *B60S 1/542* (2013.01); *G02B 27/0006* (2013.01)

(58) Field of Classification Search
CPC ........ B60S 1/0411; B60S 1/542; B60S 1/566; B60S 1/56; G02B 27/0006
USPC ...................................................... 15/250.001
See application file for complete search history.

(56) References Cited

U.S. PATENT DOCUMENTS

2017/0056932 A1* 3/2017 Tanaka ...................... B60S 3/04

FOREIGN PATENT DOCUMENTS

| | | | |
|---|---|---|---|
| DE | 102017111616 A1 * | 11/2018 | ............... H01Q 1/42 |
| KR | 102064135 B1 | 1/2020 | |
| KR | 102244095 B1 | 4/2021 | |

OTHER PUBLICATIONS

Translation of DE 102017111616A1 (Year: 2018).*

* cited by examiner

*Primary Examiner* — Tom Rodgers
(74) *Attorney, Agent, or Firm* — Lempia Summerfield Katz LLC

(57) ABSTRACT

A sensor cleaning apparatus for a vehicle includes: a sensor housing in which a driver and a sensor are mounted, a cover part configured to rotate and exposed to the outside of the sensor housing through an open region formed on a front surface of the sensor housing, and a blade part connected to the cover part. The blade is rotated as the driver is driven and provided to allow air generated by its rotation to flow toward a front surface and a rear surface of the cover.

9 Claims, 4 Drawing Sheets

SENSOR CLEANING APPARATUS FOR A VEHICLE

CROSS-REFERENCE TO RELATED APPLICATION

This application claims under 35 U.S.C. § 119(a) the benefit of and priority to Korean Patent Application No. 10-2022-0148586, filed on Nov. 9, 2022, the entire contents of which are incorporated herein by reference.

BACKGROUND

(a) Technical Field

The present disclosure relates to a sensor cleaning apparatus for a vehicle, and more particularly, to a sensor cleaning apparatus for a vehicle, which is capable of preventing a sensor from being contaminated by applying a propeller structure for forming an air curtain.

(b) Background Art

Generally, an optical detection system is a name given to any system including optical sensors, such as multiple cameras, laser sensors (commonly referred to as a light detecting and ranging (LiDAR)), or other sensors on the basis of emission or detection of light in a visible or invisible spectrum to the human eye, especially, infrared rays.

The optical detection system is installed in an increasing number of vehicles to assist a vehicle driver in certain driving situations, and one of the driving situations is well known as parking assist.

In order to allow the driving situations, such as the parking assist and the like, to be effective, data supplied by the optical detection system should always be of the highest possible quality, and therefore it is essential to have a clean optical detection system so as to perform data acquisition.

To this end, a technique for positioning a separate cleaning device around optical sensors is known, and the cleaning device is configured to spray a cleaning fluid or air immediately before detection is performed.

However, although contaminants generated on a surface of the optical sensor can be removed through the spraying of air as described above, it is impossible to block rainwater flowing into the optical sensor, and when moisture or the like is generated inside the optical sensor, it is also difficult to remove the moisture or the like.

SUMMARY OF THE DISCLOSURE

The present disclosure has been made in an effort to solve the above-described problems associated with prior art.

In one aspect, the present disclosure provides a sensor cleaning apparatus for a vehicle, which is equipped with a blade formed inside a detection sensor to be rotatable by a motor, wherein the blade is formed of an outer blade and an inner blade, which, when a motor is driven, forms an air curtain outside a glass cover by air discharged along an air flow path of the outer blade, which generates air inside the detection sensor by the inner blade, and thus which is capable of blocking rainwater from infiltrating into the detection sensor, reducing contaminations from being generated outside the glass cover, and removing moisture from an inside of the glass cover.

Objectives of the present disclosure are not limited to the above-described objectives. The objectives of the present disclosure become more apparent from the following description and should be implemented by the means described in the present disclosure.

In an embodiment of the present disclosure, a sensor cleaning apparatus for a vehicle includes: a sensor housing in which a driver and a sensor are mounted, a cover part configured to rotate and exposed to the outside of the sensor housing through an open region formed on a front surface of the sensor housing, and a blade part connected to the cover part and configured to be rotated when the driver is operating. In particular, the blade part causes air generated by rotation of the blade part to flow toward a front surface and a rear surface of the cover part while the blade part rotates.

In addition, the sensor cleaning apparatus for a vehicle may further include a rotation guiding part configured to guide rotation of the blade part disposed to be in contact with an inner circumferential surface in a state in which the outer circumferential surface is fixed inside the sensor housing.

Meanwhile, the blade part may include a main body configured to accommodate a connection member protruding from the cover part therein, a coupling gear formed at a rear side of the inner circumferential surface of the partitioned main body and provided to be engage with and coupled to the driver, a first blade formed at a front side of the inner circumferential surface being partitioned of the main body and configured to generate air as the main body is rotated to flow the generated air to the rear surface of the cover part, and a second blade formed on an outer circumferential surface of the main body at a position corresponding to the coupling gear and configured to generate air as the main body is rotated to flow the generated air toward the front surface of the cover part.

Here, the sensor housing may be formed by coupling a lower housing for mounting the driver to an upper housing for mounting the sensor, the upper housing may seal an inside of the lower housing, and an inner circumferential surface of the upper housing may be disposed to be spaced apart from an outer circumferential surface of the cover part so that an air flow path may be formed.

In addition, the air flow path may extend toward the open region and the air generated from the second blade may flow through the air flow path to form an air curtain in the open region.

In addition, the sensor housing may include a washer fluid spraying member formed to extend toward the front surface of the cover part and configured to selectively spray a washer fluid, and a wiper member disposed to be in contact with the cover part and configured to clean the front surface of the cover part as the cover part is rotated.

The sensor housing may further include a fixing member formed to fix an arrangement position with respect to the wiper member.

In addition, the cover part may include a fixing guide formed to seat a cover plate on the front surface of the sensor housing, a first fixing member fastened to a front side of the fixing guide and formed to fix a position of the cover plate, and a second fixing member having one side coupled to a rear side of the fixing guide and the other side fastened to the blade part.

In another embodiment, the present disclosure provides a sensor cleaning apparatus for a vehicle. The sensor cleaning apparatus includes: a sensor housing in which a driver and a sensor are mounted, a cover part configured to rotate and exposed to the outside of the sensor housing through an open region formed on a front surface of the sensor housing. The cover part corresponds to a mounting position of the sensor. The sensor cleaning apparatus further includes a blade part connected to the cover part and configured to be rotated as the driver is driven. The blade part allows air generated by its rotation to flow toward a front surface and a rear surface of the cover part The sensor cleaning apparatus further includes a wiper member disposed to be in contact with the front surface of the cover part inside the sensor housing and configured to clean the front surface of the cover part as the cover part is rotated.

Here, the blade part may be engaged with and coupled to the driver and may allow air generated as being rotated to flow the generated air toward the front surface and the rear surface of the cover part, respectively, and, simultaneously, may rotate the cover part to clean the front surface of the cover part through the wiper member.

Other aspects and embodiments of the present disclosure are discussed below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed in detail below.

BRIEF DESCRIPTION OF THE DRAWINGS

The above and other features of the present disclosure are now be described in detail with reference to certain embodiments thereof illustrated in the accompanying drawings which are given hereinbelow by way of illustration only, and thus are not limitative of the present disclosure, and wherein.

Figure 1:
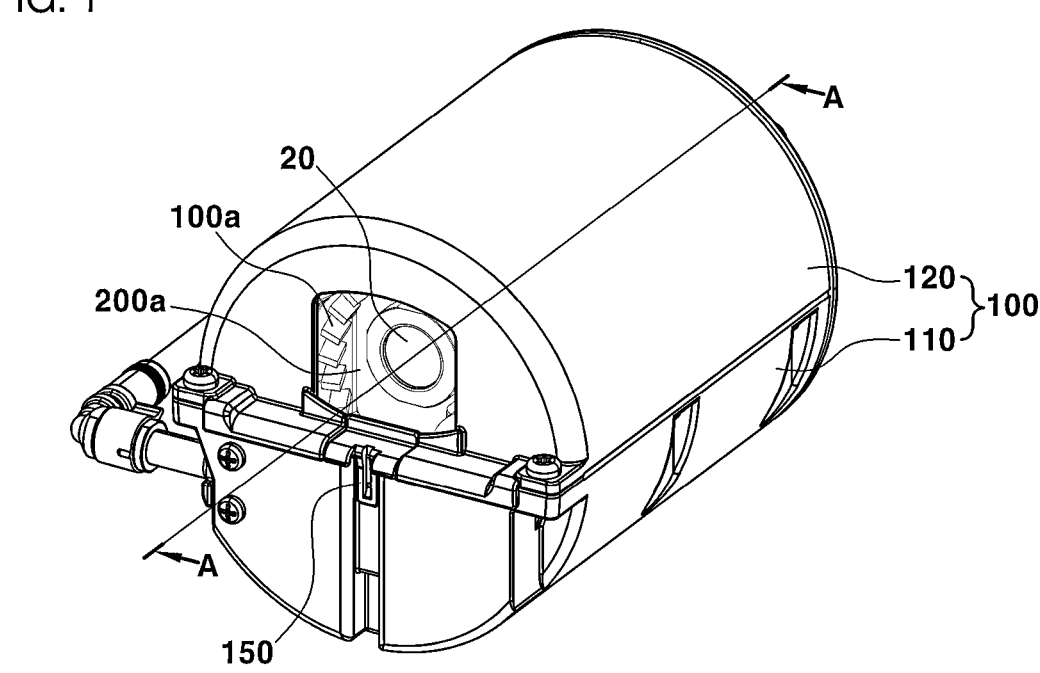
FIG. 1 is a diagram illustrating a sensor cleaning apparatus for a vehicle according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Hereinafter, embodiments according to the present disclosure are described in detail with reference to the accompanying drawings.

The advantages and features of the present disclosure and the manner of achieving the advantages and features become apparent with reference to the embodiments described in detail below with the accompanying drawings. The following description is merely exemplary in nature and is not intended to limit the present disclosure, application, or uses. It should be understood that throughout the drawings, corresponding reference numerals indicate like or corresponding parts and features.

The present disclosure may, however, be implemented in many different forms and should not be construed as being limited to the embodiments set forth herein, and the embodiments are provided such that this disclosure should be thorough and complete and should fully convey the scope of the present disclosure to those having ordinary skill in the art to which the present disclosure pertains, and the present disclosure is defined by only the scope of the appended claims.

Further, in the following description of the present disclosure, when a detailed description of a known related art is determined to unnecessarily obscure the gist of the present disclosure, the detailed description thereof has been omitted herein.

When a component, device, element, or the like of the present disclosure is described as having a purpose or performing an operation, function, or the like, the component, device, or element should be considered herein as being "configured to" meet that purpose or to perform that operation or function.

Figure 2:
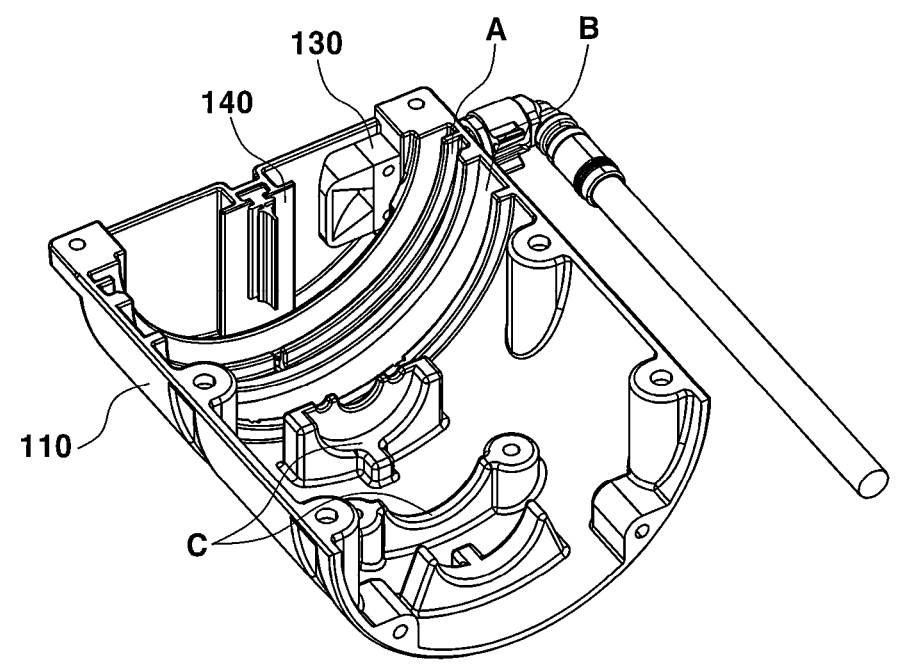
FIG. 2 is a diagram illustrating a lower housing of the sensor cleaning apparatus for a vehicle according to an embodiment of the present disclosure.
Figure 3:
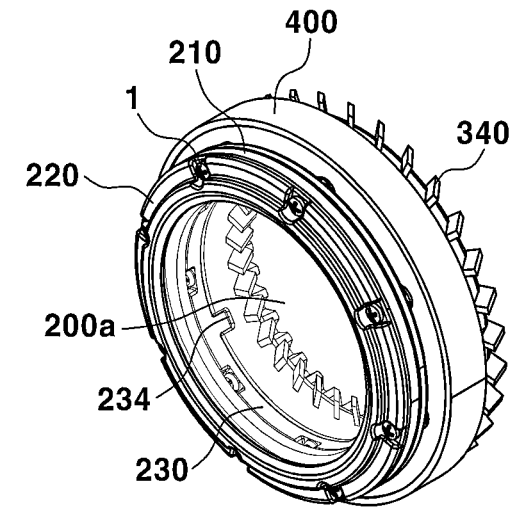
FIGS. 3 and 4 are diagrams illustrating a coupling structure between a cover part, a blade part, and a rotation guiding part of the sensor cleaning apparatus for a vehicle according to an embodiment of the present disclosure.
Figure 4:
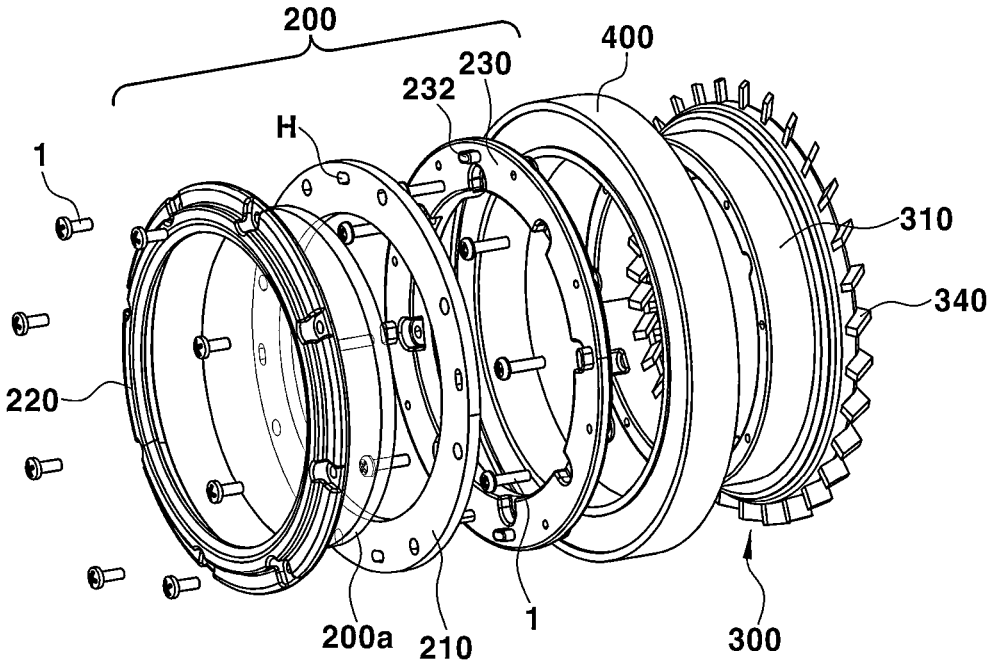

FIG. 1 is a diagram illustrating a sensor cleaning apparatus for a vehicle according to an embodiment of the present disclosure, FIG. 2 is a diagram illustrating a lower housing of the sensor cleaning apparatus for a vehicle according to an embodiment of the present disclosure, and FIGS. 3 and 4 are diagrams illustrating a coupling structure between a cover part, a blade part, and a rotation guiding part of the sensor cleaning apparatus for a vehicle according to an embodiment of the present disclosure.

Figure 5:
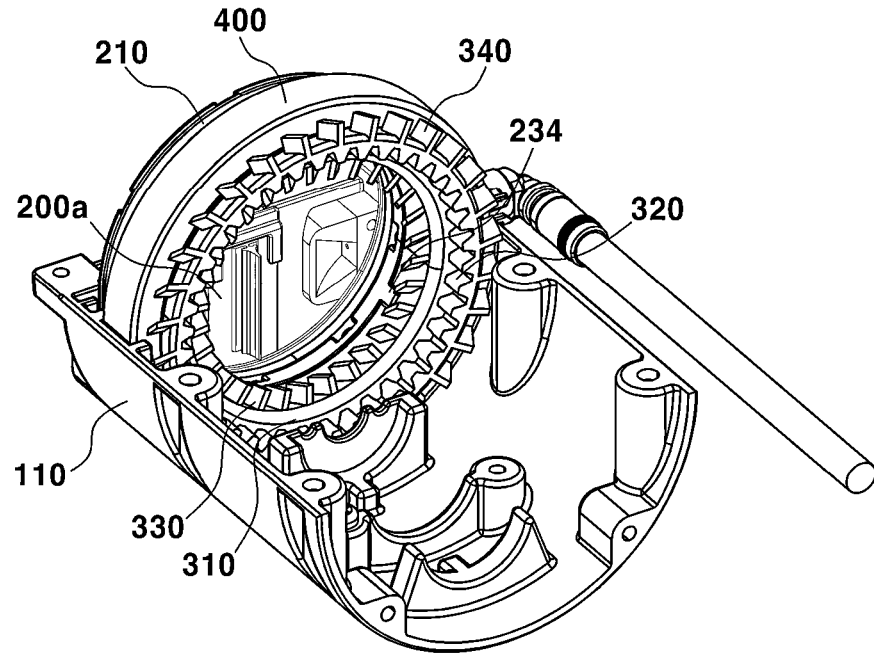
FIG. 5 is a diagram illustrating a mounting state between the cover part, the blade part, and the rotation guiding part of the sensor cleaning apparatus for a vehicle according to an embodiment of the present disclosure.
Figure 6:
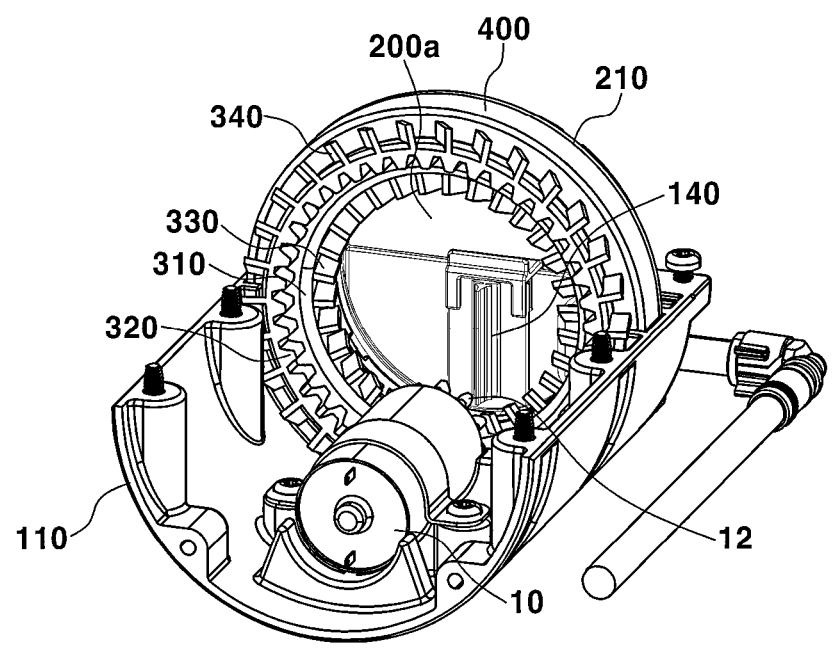
FIG. 6 is a diagram illustrating a coupling state of a driver in the sensor cleaning apparatus for a vehicle according to an embodiment of the present disclosure.
Figure 7:
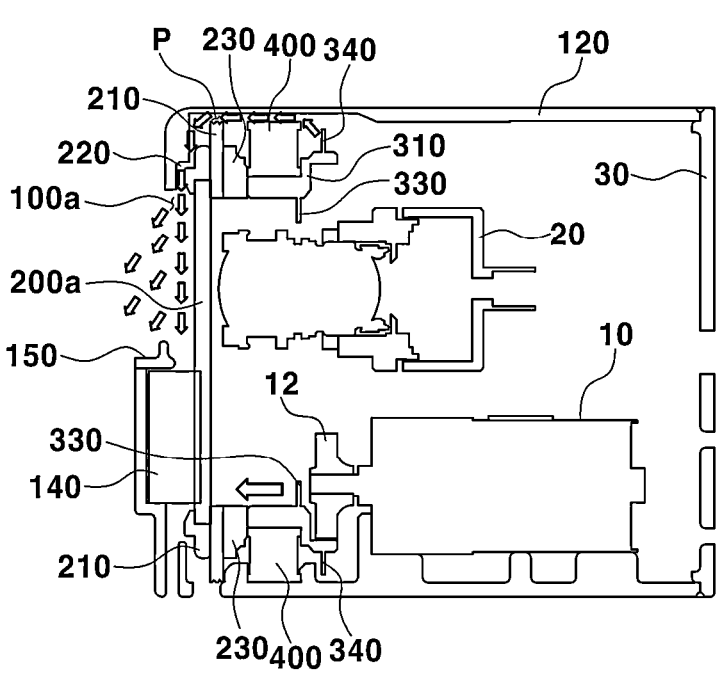
FIG. 7 is a diagram illustrating an air flow path of the sensor cleaning apparatus for a vehicle according to an embodiment of the present disclosure.

In addition, FIG. 5 is a diagram illustrating a mounting state between the cover part, the blade part, and the rotation guiding part of the sensor cleaning apparatus for a vehicle according to an embodiment of the present disclosure, FIG. 6 is a diagram illustrating a coupling state of a driver in the sensor cleaning apparatus for a vehicle according to an embodiment of the present disclosure, and FIG. 7 is a diagram illustrating an air flow path of the sensor cleaning apparatus for a vehicle according to an embodiment of the present disclosure.

Generally, a rain sensor is installed on a vehicle to adjust the speed of windshield wipers based on the amount of rainfall or snow, thus improving visibility. In addition to the rain sensor, a distance detection sensor configured to detect a distance to a preceding vehicle in an autonomous driving situation is provided in the vehicle.

The rain sensor detects raindrops on a front glass of the vehicle to detect a rainy situation (e.g., the amount of rainfall).

However, in the existing structure, when rainwater remains on a surface of a glass covering the sensor and thus contamination occurs, detection performance of the rain sensor is degraded. To prevent this, a separate blower can be installed on a side of the glass to remove the rainwater. However, there are problems in that it is difficult to completely block contamination only using a wind of the blower, costs of mounting a configuration of the blower is added, and a structure is complicated as well as a size is inevitably increased.

In addition, when the sensor is exposed to rainy conditions for an extended period of time, moisture may be accumulated inside the glass. However, since there is no mechanism to remove the moisture, the detection performance of the sensor inevitably degrades.

According to an embodiment of the present disclosure, the sensor cleaning apparatus for a vehicle may include a sensor housing 100, a cover part 200, and a blade part 300.

As shown in FIG. 1, the sensor housing 100 has a cylindrical shape and includes a lower housing 110 and an upper housing 120, which are coupled to each other. In particular, a front side of the sensor housing 100 is blocked according to the shape thereof, and a rear side thereof is coupled to a shielding cover 30 (as shown in FIG. 7) so that an inside is sealed.

In other words, bent end portions of the lower housing 110 and the upper housing 120, each having a hemispherical shape with a "¬"-shaped cross section, are coupled to face each other at both end portions of the sensor housing 100 to form a predetermined inner space. A circular-shaped shielding cover 30 is coupled to a rear side of the inner space to cover and seal the inner space.

Here, as shown in FIG. 2, the lower housing 110 includes mounting regions A and B to receive and couple with the cover part 200 and a rotation guiding part 400. In one form, the mounting regions A and B are respectively partitioned and formed in the lower housing 110 to allow the coupling of the cover part 200 and the rotation guiding part 400. In another form, a mounting region C is also partitioned and formed in the lower housing 110 for mounting of a driver 10.

In addition, a washer fluid spraying member 130 and a wiper member 140 are mounted on a side surface and a front surface of the lower housing 110, respectively.

The washer fluid spraying member 130 is formed to extend from an outer side of the sensor housing 100 toward a front surface of the cover part 200 and is provided to selectively spray a supplied washer fluid as contamination of the cover part 200 occurs.

In addition, the wiper member 140 is disposed to be in contact with the front surface of the cover part 200, which is mounted in the mounting region A. As the cover part 200 rotates, the wiper member 140 frictionally cleans a front side of the cover part 200.

In one embodiment, the wiper member 140 is inserted in a vertical direction from a front side of the upper housing 120, and a position of the wiper member 140 may be fixed by a fixing member 150 fastened to the lower housing 110 (see FIG. 1). Thus, when the wiper member 14 rubs against the front side of the cover part 200 when it rotates, the wiper member 14 may maintain a rubbing state to effectively clean the front side of the cover part 200.

In one embodiment, the cover part 200 corresponds to a mounting position of a sensor 20 and is exposed to the outside through an open region 100a formed on the front surface of the sensor housing 100 (see FIG. 1). In particular, the cover part 200 is equipped with the ability to rotate selectively.

As shown in FIG. 3, the cover part 200 may be modularized together with the rotation guiding part 400 and the blade part 300 rotatably coupled to an inner circumferential surface of the rotation guiding part 400, and in the above modularized state, the rotation guiding part 400 is fixed to the sensor housing 100 so that the cover part 200 and the blade part 300 may be mounted.

Here, as shown in FIG. 4, the cover part 200 includes a fixing guide 210, a first fixing member 220, and a second fixing member 230.

The fixing guide 210 is seated in the mounting region A partitioned on the front surface of the lower housing 110 and has a ring shape. The fixing guide 210 allows the cover plate 200a to be seated on the front surface.

The first fixing member 220 is fastened to a front side of the fixing guide 210 through a plurality of fastening members 1, thereby fixing the seated position of the cover plate 200a.

The second fixing member 230 includes one side coupled to a rear side of the fixing guide 210 through insertion of a plurality of coupling protrusions 232 into corresponding coupling holes H of the fixing guide 210. The other side of the second fixing member 230 is fastened to the blade part 300 through the fastening member 1.

Through the above configuration of the cover part 200, the position of the cover plate 200a in the sensor housing 100 may be fixed, and as a result, the sensor 20 is protected by the cover plate 200a exposed to the outside through the open region A so that it is possible to prevent detection performance from being degraded due to rainwater, foreign materials, and the like in advance.

As a part for preventing the degradation of detection performance, the blade part 300 may block infiltration of rainwater into the sensor housing 100 and, simultaneously, remove moisture from a rear surface of the cover plate 200a.

To this end, as shown in FIG. 5, the blade part 300 includes a main body 310, a coupling gear 320, first blades 330, and second blades 340.

The main body 310 is formed to accommodate the cover part 200 therein, more specifically, a connection member 234 protruding from the second fixing member 230. The main body 310 selectively rotates such that an outer circumferential surface of the main body 310 is in contact with a ball bearing (not shown) of the rotation guiding part 400.

The coupling gear 320 is formed at a rear side of the partitioned inner circumferential surface of the main body 310 and is provided to be engaged with and coupled to the driver 10.

Accordingly, as shown in FIG. 6, as a power transmission gear 12 of the engaged-coupled driver 10 is driven, the coupling gear 320 rotates the main body 310, and thus the first blades 330 and the second blades 340 are rotated to generate air to the front surface and the rear surface of the cover part 200.

In other words, the plurality of first blades 330 are formed on a front side of the partitioned inner circumferential surface of the main body 310 and are disposed obliquely at regular intervals. With the above structure, as the main body 310 is rotated, air is generated forward and thus the generated air flows to the rear surface of the cover part 200, that is, to the rear surface of the cover plate 200a.

In addition, the plurality of second blades 340 is formed on the outer circumferential surface of the main body 310 at positions corresponding to the coupling gear 320. Similar to the first blades 330, the plurality of second blades 340 is disposed obliquely at regular intervals. With the above structure, as the main body 310 is rotated, air is generated forward and thus the generated air flows to the front surface of the cover part 200, that is, toward the open region 100*a*.

As a result, as shown in FIG. 7, since the upper housing 120 constituting the sensor housing 100 is formed by bending the end portion and by being spaced apart from the first fixing member 220 inside the sensor housing 100, an air flow path P is formed in a structure in which the inner circumferential surface of the upper housing 120, the outer circumferential surface of the fixing guide 210, and the rotation guiding part 400 are spaced apart from each other. Thus, as the main body 310 is rotated, the air generated through the second blades 340 may flow toward the open region 100*a*.

Simultaneously, since the first blades 330 are also rotated as the main body 310 is rotated, as shown in FIG. 7, the air generated through the first blades 330 may flow toward the rear surface of the glass.

On the basis of the above configuration, assuming that the sensor housing 100 is for a rain sensor, a detailed description is as follows.

In a rainy situation, when contamination of the rain sensor due to rainwater is detected, a controller (not shown) of a vehicle drives the driver 10 so that the main body 310 is rotated by rotational drive of the power transmission gear 12 engaged with and coupled to the coupling gear 320.

In this way, when the main body 310 is rotated, the second blades 340 is also rotated to generate air. In this case, the generated air flows to the front surface of the cover plate 200*a* of the open region 100*a* along the air flow path P so that an air curtain is formed on the front surface of the cover plate 200*a*.

As the air curtain is formed on the front surface of the cover plate 200*a*, it is possible to effectively block rainwater from infiltrating into a gap space between the bent end portion of the upper housing 120 and the first fixing member 220.

In addition, since the main body 310 is rotated and thus the cover part 200 connected thereto is also rotated, when the cover part 200 is rotated in a state of being in contact with the fixed wiper member 140, raindrops condensed on the front surface of the cover plate 200*a* are cleaned so that the remaining raindrops may also be effectively removed.

In this case, when the main body 310 is rotated, the first blades 330 are also rotated and thus the air generated by the first blades 330 flows to the rear surface of the glass (see FIG. 7) so that the glass 100*a* is exposed to a rainy situation for a long period of time, and thus moisture generated on the rear surface of the glass 100*a* may also be effectively removed.

Finally, when the end of the rain situation is detected, the driving of the driver 10 is interrupted through the controller (not shown) of the vehicle so that the sensor cleaning apparatus for a vehicle is maintained in a standby state.

In another embodiment, assuming that the sensor housing 100 is for a distance detection sensor applied for autonomous driving, its detailed description is as follows.

When it is determined that detection information transmitted to the controller (not shown) of the vehicle is in an unstable state, it is determined that the distance detection sensor is contaminated by foreign materials such as muddy water, insects, or moisture. Thus, the driver 10 is driven and the main body 310 is rotated by the rotational drive of the power transmission gear 12 engaged with and coupled to the coupling gear 320.

As described above, when the main body 310 is rotated, the cover part 200 connected thereto is also rotatably moved. Thus, when the cover part 200 is rotated in a state in which the fixed wiper member 140 and the cover plate 200*a* are in contact with each other, foreign materials may be efficiently removed due to friction.

In this case, in order to remove the foreign materials more efficiently, a washer fluid may be controlled to be sprayed toward the front surface of the cover plate 200*a* through the washer fluid spraying member 130.

In addition, when the main body 310 is rotated, the first blade 330 is also rotated and thus the air generated by the first blade 330 flows to the rear surface of the glass (see FIG. 7) so that moisture generated on the rear surface of the glass 100*a*, which is recognized as contamination with respect to the distance detection sensor, may also be effectively removed.

Finally, as the above-described operation for removing the foreign materials and the moisture is performed, when it is determined that the detection information transmitted to the controller (not shown) of the vehicle is switched to a stable state, the driving of the driver 10 is interrupted so that the sensor cleaning apparatus for a vehicle is maintained in a standby state.

As described above, the fact that the sensor housing 100 is formed as a rain sensor or a distance detection sensor corresponds only to one example, but is not defined, and the sensor housing 10 may be applied to various sensors applied to vehicles.

In accordance with a sensor cleaning apparatus for a vehicle of the present disclosure, a motor-driven blade is installed inside a detection sensor, including an outer blade and an inner blade. When a motor is activated, the sensor cleaning apparatus forms an air curtain outside a glass cover by air discharged along an air flow path of the outer blade, and generates air inside the detection sensor by the inner blade. This helps prevent or block rainwater from entering into the detection sensor and reduce the amount of foreign materials on an outer side of the glass cover.

In addition, in accordance with the present disclosure, there is an effect in which air is generated inside the detection sensor by the inner blade and the outer blade, thereby removing moisture generated inside the glass cover.

In addition, in accordance with the present disclosure, since the sensor cleaning apparatus includes both of a structure in which the glass cover is rotated in contact with a wiper rubber fixedly disposed in the housing and a structure in which a washer fluid is sprayed to an outer side of the glass cover, when contamination occurs on the glass cover, there is an effect in which a contamination source can be easily removed.

Although the present disclosure has been described with reference to the embodiment(s) shown in the drawings, this is merely illustrative, and various modifications may be made therefrom by those having ordinary skill in the art, and it should be understood that all or a part of the above-described embodiment(s) may be optionally combined and configured.

What is claimed is:

1. A sensor cleaning apparatus for a vehicle, comprising:
   a sensor housing in which a driver and a sensor are mounted;
   a cover part configured to rotate and exposed to an outside of the sensor housing through an open region formed on a front surface of the sensor housing, the cover part corresponding to a mounting position of the sensor; and
   a blade part connected to the cover part and configured to be rotated when the driver is activated, wherein the blade part includes:

a first blade and a second blade that are configured to cause air to flow toward a front surface and a rear surface, respectively, of the cover part while the blade part rotates a main body configured to accommodate a connection member protruding from the cover part;

a coupling gear formed at a rear side of an inner circumferential surface being separated from the main body and provided to be engage with and coupled to the driver;

the first blade provided at a front side of the inner circumferential surface and configured to generate air as the main body is rotated to flow the generated air to the rear surface of the cover part; and the second blade provided on an outer circumferential surface of the main body at a position corresponding to the coupling gear and configured to generate air as the main body is rotated to flow the generated air toward the front surface of the cover part.

2. The sensor cleaning apparatus of claim 1, further comprising: a rotation guiding part configured to guide rotation of the blade part while the outer circumferential surface of the rotation guiding part is fixed inside the sensor housing, wherein the blade part is disposed to be in contact with the inner circumferential surface of the rotation guiding part.

3. The sensor cleaning apparatus of claim 1, wherein: the sensor housing is formed by coupling a lower housing for mounting the driver to an upper housing for mounting the sensor; and the upper housing seals an inside of the lower housing, and the inner circumferential surface of the upper housing is disposed to be spaced apart from the outer circumferential surface of the cover part so that an air flow path is formed.

4. The sensor cleaning apparatus of claim 3, wherein the air flow path extends toward the open region, and the air generated from the second blade flows through the air flow path to form an air curtain in the open region.

5. The sensor cleaning apparatus of claim 1, wherein the sensor housing includes:

a washer fluid spraying member formed to extend toward the front surface of the cover part and configured to selectively spray a washer fluid; and a wiper member disposed to be in contact with the cover part and configured to clean the front surface of the cover part as the cover part is rotated.

6. The sensor cleaning apparatus of claim 5, wherein the sensor housing further includes a fixing member formed to fix an arrangement position with respect to the wiper member.

7. The sensor cleaning apparatus of claim 1, wherein the cover part includes:

a fixing guide formed to seat a cover plate on the front surface of the sensor housing;

a first fixing member fastened to a front side of the fixing guide and formed to fix a position of the cover plate; and a second fixing member having a first side coupled to a rear side of the fixing guide and a second side fastened to the blade part.

8. A sensor cleaning apparatus for a vehicle, comprising:

a sensor housing in which a driver and a sensor are mounted;

a cover part configured to rotate and exposed to an outside of the sensor housing through an open region formed on a front surface of the sensor housing;

a blade part connected to the cover part and configured to rotate when the driver operates, wherein the blade part includes:

a first blade and a second blade that are configured to allow air generated by rotation of the blade part to flow toward a front surface and a rear surface of the cover part, respectively; and a main body configured to accommodate a connection member protruding from the cover part;

a coupling gear formed at a rear side of an inner circumferential surface being separated from the main body and provided to be engage with and coupled to the driver;

the first blade provided at a front side of the inner circumferential surface and configured to generate air as the main body is rotated to flow the generated air to the rear surface of the cover part; and the second blade provided on an outer circumferential surface of the main body at a position corresponding to the coupling gear and configured to generate air as the main body is rotated to flow the generated air toward the front surface of the cover part; and a wiper member disposed to be in contact with the front surface of the cover part inside the sensor housing and configured to clean the front surface of the cover part as the cover part is rotated.

9. The sensor cleaning apparatus of claim 8, wherein the blade part is engaged with and coupled to the driver and allows the air to flow toward the front surface and the rear surface of the cover part, respectively and, simultaneously, configured to rotate the cover part to clean the front surface of the cover part through the wiper member.

\* \* \* \* \*